July 1, 1969 J. S. GOLIGHTLY 3,453,161
PRODUCING BENT LAMINATED WINDSHIELDS
Filed May 25, 1966

INVENTOR
JAMES S. GOLIGHTLY
BY
ATTORNEYS

United States Patent Office 3,453,161
Patented July 1, 1969

3,453,161
PRODUCING BENT LAMINATED WINDSHIELDS
James S. Golightly, Pittsburgh, Pa., assignor to PPG Industries, Inc., a corporation of Pennsylvania
Filed May 25, 1966, Ser. No. 552,978
Int. Cl. C03c 27/12; B32b 17/00
U.S. Cl. 156—102                                    5 Claims

ABSTRACT OF THE DISCLOSURE

This invention concerns a method for simultaneously bending two pair of superimposed glass sheets, taking the upper pair of adjacent glass sheets and laminating them to a sheet of thermoplastic interlayer material and taking the lower pair of adjacent glass sheets and laminating them to a different sheet of thermoplastic interlayer material.

---

This invention relates to a method of fabricating bent laminated windshields and is especially suitable for mass production of one piece automobile windshields of safety glass conforming to the American Standard Safety Code for Safety Glazing Materials for Glazing Motor Vehicles Operating on Land Highways Z 26.1 (1950), approved May 16, 1950 by the American Standards Association Incorporated.

Automobile windshields of safety glass consist essentially of two matched sheets of curved glass such as commercial plate glass or float glass of a soda-lime-silica composition, and an interlayer of a sheet of thermoplastic resin such as plasticized polyvinyl butyral sandwiched between the two glass sheets. The plastic interlayer is resilient and also adheres to the glass. Therefore, when a laminated safety glass windshield is broken on impact, the glass sheet fragments that form with dangerous jagged edges do not fly about. Instead, they remain attached to the plastic interlayer while the latter yields in response to the impact.

In present commercial practice, laminated safety glass windshields are mass produced by the following series of steps:

(1) Cutting flat sheets to their ultimate outline differing slightly in size from one another;
(2) Arranging the sheets in pairs;
(3) Applying a parting material to the upper surface of the slightly larger sheet of each pair;
(4) Aligning each pair of sheets in face to face relation so that the slightly smaller sheet is above the other sheet of the pair and the parting material is between the sheets of the pair;
(5) Mounting a pair of aligned sheets on an outline bending mold having an upwardly facing surface of concave elevation that conforms in elevation and plan outline to the shape slightly inward of the aligned margins of the pair of sheets after bending;
(6) Passing a succession of glass laden molds through a bending an annealing lehr where the glass sheets are heated to their deformation temperature and they sag by gravity until the lower sheet conforms to the outline shaping surface and the upper sheet of the pair sags to conform to the shape of the lower sheet;
(7) Cooling the glass sheets in a controlled manner from their deformation temperature through their annealing range to anneal the glass sheets as soon as the glass sheets attain their desired curvature;
(8) Further cooling the bent annealed sheets to a temperature at which the glass sheets can be handled;
(9) Removing each pair of bent glass sheets from each mold in succession and returning the molds for another bending and annealing cycle;
(10) Separating the bent glass sheets of each pair from one another temporarily;
(11) Assembling a glass-plastic sandwich by inserting a sheet of thermoplastic material stored in a room of controlled temperature and humidity between the bent glass sheets of each pair to form a sandwich with the thermoplastic sheet as its interlayer;
(12) Trimming any excess of plastic material from the periphery of each assembled sandwich, if needed;
(13) Removing entrapped fluid from between the interfaces between the inner surfaces of the glass sheets and the thermoplastic interlayer and adhering the margins of the layers of each sandwich to one another by passing the sandwich while heated between nipper rolls or, preferably, by evacuating the fluid from a peripheral chamber enclosing the heated sandwich while the major surfaces are exposed to atmospheric pressure;
(14) Completing the lamination by exposing the marginally adhered sandwich to elevated temperature and pressure, preferably in batches in an oil autoclave;
(15) Washing any excess oil from the outer surfaces of the laminated sandwiches;
(16) Drying the sandwiches, which should now be optically transparent so as to be suitable for use as a windshield;
(17) Inspecting each windshield so produced for optical defects and making periodic destruction tests of random samples to check for quality; and
(18) Packaging and shipping the bent windshields that pass inspection.

A vital factor in determining the rate of windshield production is the throughput of the bending and annealing lehr or the rate of bending windshield pairs. The lehr length determines the number of glass laden molds that can be handled simultaneously. The intensity of heat supplied per unit length of lehr determines how rapidly the glass laden molds can be conveyed through the bending zone and arrive at the beginning of the cooling zone properly bent within the tolerances required by the customer.

For any given lehr to produce any given production pattern, the heating elements are controlled to impart a unique series of successive heating patterns designed to correlate with the rate of speed of bending molds through the bending lehr to cause the glass sheets to conform exactly to the shaping surface of the mold at the time the heated glass enters the cooling and annealing zone. The series of heating patterns form a longitudinal temperature profile that is unique for each windshield production pattern. A record of the series of heating patterns or longitudinal temperature profile is kept for that lehr for each production windshield pattern for use whenever production schedules require additional production of a windshield pattern produced previously.

Similarly, since no two production lehrs are exactly alike, the same production pattern usually requires a different series of heating patterns or longitudinal temperature profile when produced in different lehrs.

In recent years, automobile sales throughout the world and particularly in the United States, have expanded rapidly from year to year. This phenomenal continued growth of automotive sales has required a phenomenal rate of growth in windshield production. In the past, this increased production was accomplished by building new bending lehrs and running more molds per unit time through existing lehrs than previously by conveying glass laden molds more rapidly through the lehrs than previously while increasing the rate of heat applied to the glass to compensate for the shorter time of exposure of the glass to the hot environment of the bending lehr.

In any given lehr, there is a maximum production rate dependent upon the maximum heat input that can be supplied to the bending lehr. Furthermore, running heating elements at their fullest capacity increases their rate of wear, thus causing the lehr to be shut down more frequently for repair and replacement of heating elements than when the latter are run at only a fraction of their capacity. Therefore, it is often the case that the total bending lehr production over a prolonged period is not increased by increasing the heat irradiated by the lehr heating elements.

It has now been discovered that it is possible to increase the rate of bent windshield production for certain relatively simple bent windshield patterns without building additional lehrs and without chancing more frequent breakdowns in operation of the bending lehr elements.

According to the present invention, each bending mold for a particular windshield pattern is loaded with two pairs instead of the customary one pair of matched glass sheets for bending. The molds while so loaded are conveyed through the bending lehr set for the series of successive heating patterns for that windshield at a speed that is greater than one-half the customary speed for that windshield pattern. At the end of the bending zone, all four glass sheets are matched in shape to that of the mold shaping surface. After the mold passes through the annealing lehr, both pairs of glass sheets are removed from the mold. The upper pair of bent sheets is separated from the lower pair of bent sheets.

Then, each of the separated pairs of bent sheets is treated as if it were bent in conventional fashion on a separate bending mold instead of having shared a mold with another pair of glass sheets during the bending operation.

In cases where glass sheets are bent to curvatures having relatively sharply bent longitudinal end regions, it is preferable to bend the pairs in unison on a mold whose shaping surface differs in length between the sharply bent regions by less than the thickness of the lower pair in a direction that makes one of the pairs slightly longer and the other pair slightly shorter in length between the sharply bent regions than desired. If the mold is concave in elevation, it is preferably slightly longer than the exact length required for the windshield between the sharply bent end regions. If the mold is convex in elevation, the distance between the sharply bent end regions is preferably slightly less than the exact length separating the sharply bent regions of the opening in which the bent windshield is to be installed.

This variation in shaping surface contour from the exact shape of the opening for the bent windshield is not necessarily limited to molds for producing windshields having sharply bent regions. Laminated windshields can be flexed somewhat during installation. However, it is preferable to have each windshield subject to the minimum flexing possible during installation in a curved automobile frame. If the mold shaping surface has the exact dimensions of the opening of the automobile model to be glazed, the lower pair would fit the opening exactly and the upper pair would have to be flexed the total flexing required for both pairs bent simultaneously. It is preferable to share the flexing required between the pairs to some extent, preferably by providing a shaping surface that causes one pair to be longer than the exact shape by the same amount that the other pair bent in unison is shorter than the exact amount. This equalizes the flexing required for the upper and lower pairs during their installation.

The gist of the present invention will be understood more readily from a description of an illustrative embodiment of the present invention which follows.

In the drawings which form part of the description,

Figure 1:
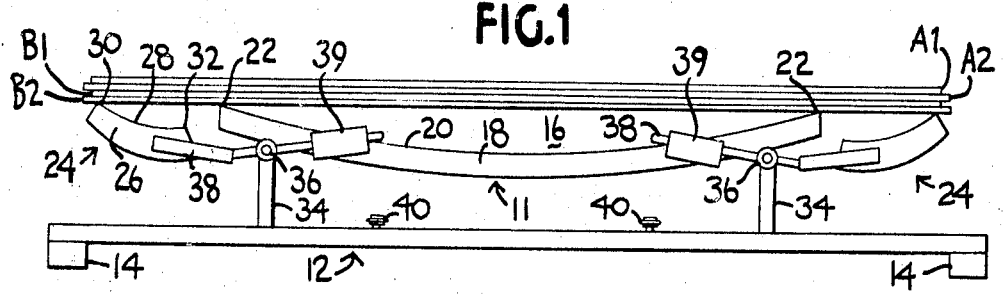
FIG. 1 is a longitudinal elevation showing how flat glass sheets are mounted on a sectionalized mold for bending according to the present invention.

Referring to the drawings, a conventional sectionalized bending mold 11 of the outline skeleton type is shown mounted on a support carriage 12, also of outline skeleton type. The carriage 12 includes a pair of transversely extending rails 14 which ride along the upper surfaces of conveyor rolls (not shown) which define a path of movement for the mold through a tunnel-like bending and annealing lehr.

The molds are of the sectionalized, outline type and comprise a center mold section 16 comprising a pair of elongated shaping rails 18 each having an upper surface 20 extending longitudinally along one of the opposite sides of the outline surface to form the central portion thereof. The upper shaping surfaces 20 of the center mold section shaping rails 18 terminate in extremity portions 22 which lie in a common plane for supporting the under surface of a flat glass sheet preparatory to bending.

Each sectionalized mold also contains a pair of end mold sections 24. Each of the latter comprises a shaping rail 26 conforming in plan to the outline of the bent glass sheet and has an upper shaping surface 28 conforming in elevation to the shape desired for the extremity portion of the bent glass sheet that it supports for the bending operation.

The shaping rail 26 has an outer extremity 30 and an inner extremity 32. Each of the end sections 24 is pivoted relative to the center section 16 between a spread position depicted in FIG. 1 wherein the outer extremities 30 of the end shaping rail sections 26 lie in a common plane with the extremity portions 22 of the shaping rails 18 of the center section 16 to support the glass in non-tilting relation preparatory to bending. The end sections 24 pivot into a closed mold position depicted in FIG. 2 wherein the inner extremities 32 of the upper shaping surfaces 28 of the shaping rails 26 of end sections 24 lie closely adjacent to the extremity portions 22 of the upper surfaces 20 of the shaping rails 18 of the center section 16 to form a substantially continuous outline shaping surface conforming in elevation and outline to the shape desired for the bent glass.

Posts 34 extend upward from the opposite sides of the mold support carriage 12 to serve two purposes. They rigidly connect the shaping rails 18 to the mold carriage 12 and they provide support for hinges 36.

Lever arms 38 extend longitudinally inward of the mold in planes laterally outside the mold outline. Their outer ends are connected to the outermost surfaces of the end section rails 26, and they are pivoted about the hinges 36 and are provided with weights 39 between their pivotal connection to the hinges 36 and their inner ends.

Figure 2:
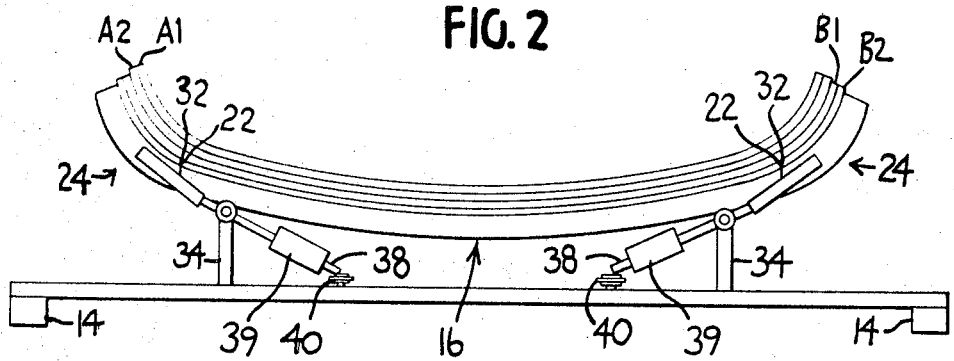
FIG. 2 shows how the glass sheets are related to the shaping mold after bending has been completed.
Figure 3:
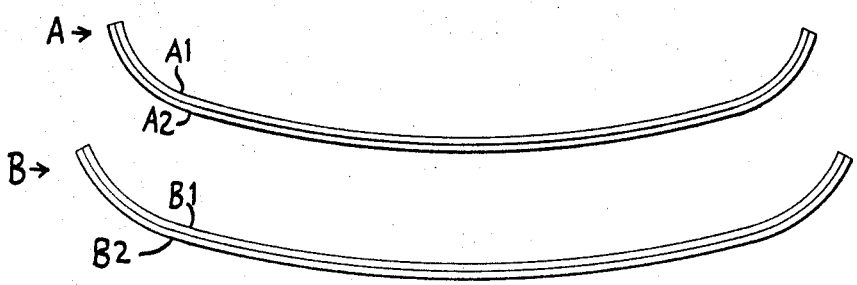
FIG. 3 shows how the glass sheets are separated into pairs for final assembly and lamination.
Figure 4:
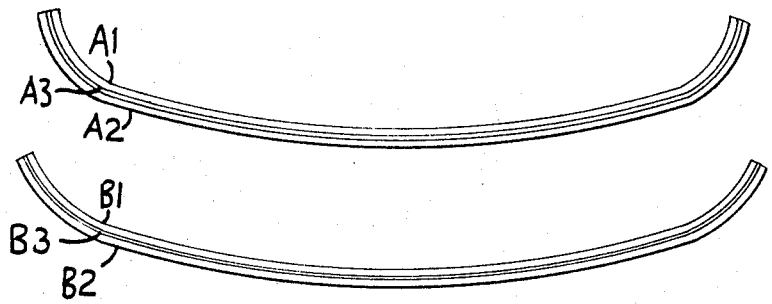
FIG. 4 shows how the separate pairs of glass sheets are laminated after being separated as shown by FIG. 3.

Stop members 40 are provided to be engaged by the inner ends of the lever arms 38 to cause the end sections 24 to be oriented properly relative to the center section 16 to enable the mold to assume a closed mold position wherein the inner end extremities 32 of the upper shaping surfaces 28 of the end mold section shaping rails 26 are closely adjacent to the extremity portions 22 of the upper surface 20 of the center section shaping rails 18 as depicted in FIG. 2. The stop members 40 preferably comprise set screws mounted on brackets, the latter attached to suitable portions of the mold carriage 12.

The molds just described are typical sectionalized outline molds which have been used in production. Prior to the present invention, they have been successfully employed in bending glass sheets in single pairs wherein the glass sheets after bending have been laminated to one another to form safety shields.

In preparing glass sheets for bending in pairs, it is customary to mount a glass sheet A–1 over a glass sheet A–2 on a mold of concave elevation preparatory to bending. Normally, the two glass sheets of the pairs are cut to slightly different dimensions with the lower sheet A–2 slightly larger than the upper sheet A–1. With a proper difference in dimensions, the edges of the sheets after bending are in alignment.

According to the present invention, an upper pair of sheets A comprising a slightly smaller upper sheet A–1, and a slightly larger upper sheet A–2 are superimposed on an additional pair of sheets B comprising an upper slightly smaller sheet B–1 and a lower slightly larger sheet B–2. Sheets A–1 and B–1 are identical in dimensions and sheets B–1 and B–2 are identical in dimensions. The four sheets are mounted on a mold in a manner depicted in FIG. 1, after the under surfaces of sheets A–1, A–2 and B–1 have been sprayed with an aqueous dispersion of a diatomaceous earth to impart a parting material between the facing surfaces of the adjacent glass sheets of the stack to be bent simultaneously.

The four glass sheets are mounted on the sectionalized outline mold 11 in the manner indicated and conveyed through a bending and annealing lehr where the glass is heated to its deformation temperature. The glass softens in response to this exposure to heat and the weights 39 on the lever arms 38 rotate the end mold sections 24 upward to cause the sectionalized mold to assume the closed mold position. Glass sheets A–1 and A–2 and B–1 and B–2 are all bent into conforming curvature. The edges of sheets B–1 and B–2 are in substantial alignment after bending, whereas the sheet A–1 and A–2 are in substantial alignment after bending.

After the glass has been bent and annealed, all the four sheets are removed from the mold and bent sheets A–1 and A–2 are separated from bent sheets B–1 and B–2. Then a sheet of interlayer material A–3 is inserted between bent sheets A–1 and A–2 and an additional sheet of interlayer material B–3 is inserted between sheets B–1 and B–2. The two assemblies, one containing glass sheets A–1 and A–2 with the plastic sheet A–3 as an interlayer and the other containing glass sheets B–1 and B–2 with the plastic sheet B–3 as its interlayer, are then laminated in accordance with usual commercial practice, preferably as taught in U.S. Patent No. 2,948,645.

The feasibility of bending two pairs of windshield patterns simultaneously was determined using two patterns, one a windshield pattern for a Valiant automobile, the other a windshield pattern for a Rambler automobile. Both the conventional method of bending single pairs of each pattern and the method of bending double pairs of the patterns were run for comparison in an identical bending lehr. The single bent pairs were bent while conveyed at a continuous speed through the lehr and the double bent pairs were similarly processed except at either a slower speed or at the same speed utilizing a higher temperature within the various sections of the lehr.

The lehr used for this work was 8 feet wide, 4 feet high surrounded by walls of insulating brick 8½ inches thick and a floor of similar insulation of similar thickness mounted on a sheet metal bed supported in a plane spaced about 1½ inches from the floor of the building. The electric coils were adjusted in each section of the lehr in response to thermoresponsive elements set in the longitudinal center of each lehr zone. The lehr zones were 20 feet long for the preheat zone, 7½ feet long for a first bending zone, 7½ feet long for a second bending zone and 25 feet long for an annealing zone. The thermoresponsive elements "read" the coil temperatures centrally of each zone.

EXAMPLE I

After several trials, which seems conventional in commercial operation, a bending cycle of temperature and rate of speed through the lehr was established to consistently bend a Valiant windshield pattern with good optical quality.

The acceptable temperature profile along the length of the lehr for bending single pairs of the Valiant windshield was established at 1100 degrees Fahrenheit in the pre-heat zone, 1400 degrees Fahrenheit in the first bending zone, 1550 degrees Fahrenheit in the second bending zone and 800 degrees Fahrenheit in the annealing zone. Single pairs of windshields were conveyed through the lehr at a speed of 25 inches per minute using a closing force for the end mold sections of 5 pounds.

Acceptable windshields were laminated from two pairs bent simultaneously under the following circumstances when the closing force for the end mold sections was between 10 and 12 pounds. In one operation, the double pairs were conveyed through the lehr at the same speed as the single pairs with the temperature profile set to a more intensive heat pattern of 1200 degrees Fahrenheit in the pre-heat zone, 1600 degrees Fahrenheit in the first and second bending zones, and 1000 degrees Fahrenheit in the annealing zone. The other operation used the same temperature profile as for the single pair bending operation but reduced the speed of the glass conveyance to 16 inches per minute.

It was determined that the over-all increase of electrical input to the electric heaters to cause the increase in temperature was about 10 percent in the first operation of bending double pairs. Thus, an increase of 10 percent in electrical input increased the production rate of the Valiant windshield 100 percent. The production rate in the second operation was increased by almost 30 percent by substituting a double pair bending for single pair bending at the temperature profile established for single pair bending.

The bent glass sheets produced by both single pair and double pair bending were laminated with polyvinyl butyral sheeting having a thickness of .015 inch. Acceptable results were obtained in both the upper and lower pair of windshield produced from bending using the double pair bending technique.

EXAMPLE II

The double pair bending technique was compared with single pair bending technique in the production of Rambler windshields. The closing pressure applied to the end mold sections for bending single pairs was 4.5 pounds. The closing pressure for the end mold sections for bending double pairs simultaneously had to be increased to about 9 pounds.

One operation to produce Rambler windshields involved changing the speed of the molds through the lehr from 25 inches per minute for a single pair bending operation to 18 inches per minute for a double pair bending operation using a longitudinal temperature profile previously established for single pair bending of 1050 degrees Fahrenheit in the preheat zone, 1380 degrees Fahrenheit in the first bending zone, 1500 degrees Fahrenheit in the second bending zone and 900 degrees Fahrenheit in the annealing zone. Thus, an increase in the production of 44 percent was obtained by the double-pair bending technique compared to single-pair bending merely by reducing the speed of the molds through the lehr without changing the temperature profile along the length of the lehr.

Double pair bending of the Rambler windshields was also done by establishing a new temperature pattern for the 25 inches per minute speed. The temperature profile of the heating coils for the double pair bending of Rambler windshields at a lehr speed of 25 inches per minute was set to produce a temperature of 1150 degrees Fahrenheit in the pre-heat zone, 1430 degrees Fahrenheit in the first bending zone, 1550 degrees Fahrenheit in the second bending zone and 1000 degrees Fahrenheit in the annealing zone. This thermal input was about 5 percent over the thermal input for the temperature profile previously established for single pair bending at the same speed.

All the windshields produced in the two tests by either the single pair bending or double pair bending technique laminated out to 100 percent clarity. Thus, they produced acceptable windshields for use in commerce.

Present commercial automobile windshields are mounted in curved windshield frames having a given length between sharply bent end regions. The bent windshields that fit in the opening are permitted to vary in length by an amount limited by the flexibility of the bent glass sheets comprising the windshield. Each glass sheet in the bent windshield has a thickness of ⅛ inch. Therefore, the difference in length between the sharply curved regions of the pairs bent simultaneously is the difference that results from mounting the upper pair about ¼ inch above the shaping surface for the lower pair. While the difference in length between the sharply curved regions of the pairs falls within customer requirements for tolerance for windshields bent to curvatures whose sharply bent portions have a minimum radius of curvature of as little as 12 inches, all windshields produced can be made to conform within half the tolerance by bending two pairs of glass sheets on a concave mold defining a curve whose length exceeds the exact length of the frame by half the thickness of the lower windshield pair. Under such circumstances, the lower bent pair is larger than the exact distance between the sharply bent regions by half the difference between the upper and lower pair, and the upper pair is smaller by half this difference. Thus, each windshield need be flexed half the amount that would be needed to flex the upper pairs if the bottom pairs were bent exactly to size.

What is claimed is:

1. In a method of producing bent laminated windshields comprising a pair of matched glass sheets and a thermoplastic interlayer comprising the following steps:
   mounting at least two pairs of glass sheets on a single glass sheet bending mold so that one of said pairs is superimposed on the other pair;
   simultaneously bending said pairs of glass sheets into conformity with an upwardly facing shaping surface formed on said bending mold by exposing said sheets to an elevated temperature for sufficient time to deform the sheets to conform to said shaping surface;
   removing said pairs of glass sheets from said bending mold;
   the improvement consisting of separating said upper pair from said lower pair of glass sheets;
   assembling said upper pair of glass sheets with a thermoplastic interlayer to form a first laminated glass plastic assembly;
   assembling the lower pair of said glass sheets with a thermoplastic interlayer to form a second laminated glass-plastic assembly; and
   laminating each assembly to form a laminated windshield.

2. The improvement according to claim 1, wherein each said pair of matched glass sheets comprises an upper sheet having a slightly smaller length and a lower sheet having a slightly larger length, the length of the upper sheet of each pair being substantially equal to the length of the upper sheet of the other pair and the length of the lower sheet of each pair being equal to the length of the lower sheet of the other pair.

3. The improvement according to claim 1, wherein said two pairs of glass sheets are bent while simultaneously supported on a mold by moving the mold through a bending lehr having a temperature profile previously established for bending a single pair of glass sheets characterized by moving the glass at a speed that is more than one-half and less than the speed of movement established for bending a single pair of glass sheets using said established temperature profile.

4. The improvement as in claim 1, wherein said four glass sheets are bent in unison by moving said sheets on a single bending mold at a speed established for bending a single pair of glass sheets through a lehr having a longitudinal temperature profile requiring a thermal input greater than that required for a temperature profile established for bending a single pair of sheets at said speed by a maximum of 10 percent.

5. The improvement of bending as in claim 1, wherein the two pairs of glass sheets are mounted on molds having upwardly facing surfaces defining relatively sharp regions of curvature near their opposite longitudinal ends, the distance between said relatively sharp region of curvature differing from the exact length required for the bent pairs by less than the thickness of said lower pair of glass sheets, whereby one of said bent pairs is slightly shorter in length between relatively sharp regions of curvature imparted thereto by less than the thickness of said lower pair.

References Cited

UNITED STATES PATENTS

| 2,314,325 | 3/1943 | Binkert | 156—102 |
| 3,093,527 | 6/1963 | Wheeler | 156—102 |

ROBERT F. BURNETT, *Primary Examiner.*

W. J. VAN BALEN, *Assistant Examiner.*

U.S. Cl. X.R.

156—106; 161—199